US008375283B2

(12) United States Patent
Fei et al.

(10) Patent No.: US 8,375,283 B2
(45) Date of Patent: Feb. 12, 2013

(54) SYSTEM, DEVICE, METHOD, AND COMPUTER PROGRAM PRODUCT FOR ANNOTATING MEDIA FILES

(75) Inventors: Yue Fei, Irving, TX (US); Koichi Mori, Tampere (FI); Tolga Capin, Irving, TX (US)

(73) Assignee: Nokia Corporation, Espoo (FI)

( * ) Notice: Subject to any disclaimer, the term of this patent is extended or adjusted under 35 U.S.C. 154(b) by 712 days.

(21) Appl. No.: 11/425,306

(22) Filed: Jun. 20, 2006

(65) Prior Publication Data

US 2007/0293265 A1 Dec. 20, 2007

(51) Int. Cl.
*G06F 17/00* (2006.01)
*H04N 5/228* (2006.01)

(52) U.S. Cl. ........ 715/205; 715/234; 715/273; 715/809; 348/142; 348/174

(58) Field of Classification Search ................. 715/200, 715/201, 203, 205, 230, 231–255, 273, 700, 715/719, 727, 728, 731, 760, 202, 204, 206, 715/207, 229, 256, 274, 730, 732, 762, 790, 715/791, 796, 809; 348/137, 14.03, 142, 348/143, 174, 207.1, 207.11, 208.12, 208.16, 348/220.1, 231.3, 231.5, 333.05, 361, 660, 348/73

See application file for complete search history.

(56) References Cited

U.S. PATENT DOCUMENTS 5,974,386 A * 10/1999 Ejima et al. ............. 704/276
6,128,446 A * 10/2000 Schrock et al. .......... 396/297
6,295,391 B1 * 9/2001 Rudd et al. .............. 382/313
6,462,778 B1 * 10/2002 Abram et al. ............ 348/239
6,499,016 B1 12/2002 Anderson et al.
6,507,363 B1 * 1/2003 Anderson et al. ........ 348/231.9

(Continued)

FOREIGN PATENT DOCUMENTS

EP 0905679 * 3/1999
EP 1280329 A2 * 1/2003

(Continued)

OTHER PUBLICATIONS

Minolta Co., Ltd. "Dimage Xt Biz Quick Guide Instruction Manual", 2003 Minolta Co., Ltd, 28 pages.*

(Continued)

*Primary Examiner* — Maikhanh Nguyen
(74) *Attorney, Agent, or Firm* — Alston & Bird LLP

(57) ABSTRACT

A system, device, method, and computer program product are provided for allowing a user of the device to more easily annotate data files and/or images received by or created by the electronic device or system. For example, according to one embodiment, when a user takes a digital picture using a camera-equipped mobile phone, annotation data may be automatically presented to the user when a preview of the image is first displayed on the electronic display. The annotation data may be presented to the user as a list that semi-transparently overlays the preview of the image. The annotation list and/or the individual annotations that make up the list may be customizable. The annotation choices in the list may correspond to keys on the electronic device. Annotation data may be stored with the image or file as embedded metadata. The selected annotation data may also be used to create file folders in a memory device and/or store the image or file in a particular file folder in the memory device.

9 Claims, 6 Drawing Sheets

U.S. PATENT DOCUMENTS

| | | | |
|---|---|---|---|
| 6,629,104 B1* | 9/2003 | Parulski et al. | 382/307 |
| 6,683,649 B1* | 1/2004 | Anderson | 348/333.05 |
| 6,721,001 B1* | 4/2004 | Berstis | 348/231.3 |
| 7,092,116 B2* | 8/2006 | Calaway | 358/1.18 |
| 7,107,516 B1* | 9/2006 | Anderson et al. | 715/210 |
| 7,107,520 B2* | 9/2006 | Gargi | 715/210 |
| 7,171,113 B2* | 1/2007 | Parulski et al. | 396/287 |
| 7,234,106 B2* | 6/2007 | Simske | 715/230 |
| 7,265,786 B2* | 9/2007 | Venturino et al. | 348/333.02 |
| 7,327,347 B2* | 2/2008 | Hilbert et al. | 345/156 |
| 7,483,693 B2* | 1/2009 | Lueng et al. | 455/414.1 |
| 7,702,645 B2* | 4/2010 | Khushraj et al. | 707/999.102 |
| 7,924,323 B2* | 4/2011 | Walker et al. | 348/231.2 |
| 2002/0061741 A1* | 5/2002 | Leung et al. | 455/414 |
| 2002/0186412 A1* | 12/2002 | Murashita | 358/1.16 |
| 2003/0058275 A1* | 3/2003 | Pilu et al. | 345/751 |
| 2003/0088536 A1* | 5/2003 | Behnia | 707/1 |
| 2003/0218624 A1* | 11/2003 | Quintana et al. | 345/716 |
| 2004/0004663 A1* | 1/2004 | Kahn et al. | 348/207.1 |
| 2004/0027624 A1* | 2/2004 | Parulski et al. | 358/527 |
| 2004/0051803 A1* | 3/2004 | Venturino et al. | 348/333.02 |
| 2004/0064455 A1* | 4/2004 | Rosenzweig et al. | 707/100 |
| 2004/0119722 A1 | 6/2004 | Hilbert et al. | |
| 2004/0201692 A1 | 10/2004 | Parulski et al. | |
| 2004/0201740 A1 | 10/2004 | Nakamura et al. | |
| 2004/0263661 A1* | 12/2004 | Okisu et al. | 348/333.02 |
| 2005/0001909 A1* | 1/2005 | Okisu et al. | 348/231.5 |
| 2005/0044084 A1* | 2/2005 | Huang | 707/100 |
| 2005/0198024 A1* | 9/2005 | Sakata et al. | 707/4 |
| 2005/0246652 A1 | 11/2005 | Morris | |
| 2006/0098105 A1* | 5/2006 | Okisu et al. | 348/231.99 |
| 2006/0170669 A1* | 8/2006 | Walker et al. | 345/418 |
| 2007/0008321 A1* | 1/2007 | Gallagher et al. | 345/473 |
| 2007/0053004 A1* | 3/2007 | Calaway | 358/3.28 |
| 2007/0083827 A1* | 4/2007 | Scott et al. | 715/811 |
| 2007/0116456 A1* | 5/2007 | Kuriakose et al. | 396/310 |

FOREIGN PATENT DOCUMENTS

| | | |
|---|---|---|
| EP | 1004967 B1 | 3/2004 |
| WO | WO 02/057959 A2 * | 7/2002 |
| WO | WO 2006/040697 | 4/2006 |

OTHER PUBLICATIONS

Sarvas et al., "Metadata Creation System for Mobile Images", ACM, Jun. 2004, pp. 36-48.*

Davis et al., "From Context to Content: Leveraging Context to Infer Media Metadata", ACM, Oct. 2004, pp. 188-195.*

International Search Report from PCT/IB2007/001606 dated Feb. 4, 2008.

Office Action, dated Oct. 25, 2010, of corresponding Korean Application No. 2009-7001075.

Office Action, dated Aug. 24, 2011, of corresponding Chinese Application No. 200780022952.1.

Chinese Office Action dated Feb. 15, 2012 for Application No. CN200780022952.1.

\* cited by examiner

SYSTEM, DEVICE, METHOD, AND COMPUTER PROGRAM PRODUCT FOR ANNOTATING MEDIA FILES

FIELD OF THE INVENTION

Embodiments of the present invention relate generally to systems for annotating media files, and more particularly, to a systems, devices, methods, and computer program products that make it easier for a user to annotate image files with customized annotation information.

BACKGROUND OF THE INVENTION

Digital camera technology has advanced significantly over the past decade. Today, digital cameras are affordable, take high quality pictures, and can be made very small. As a result, digital cameras are becoming increasingly popular and, for many people, digital cameras have replaced the conventional film-based camera. Furthermore, digital cameras are now included in many types of electronic devices that perform functions other than picture-taking functions. For example, many mobile communication terminals, such as mobile telephones and PDAs, now include small digital cameras as an additional feature of the mobile telephone.

In addition to the advancements in digital camera technology, significant advancements have been made in memory technology. Mainly, these advancements have led to memory devices that are smaller and more affordable than in the past. As a result, a single handheld electronic device may be able to hold hundreds, if not thousands, of photos. Furthermore, since a person does not have to purchase film and since the pictures can be easily downloaded from the camera to a computer or other large memory device, people now take many more photographs than they did in the past. In fact, it is quite possible that many digital camera users will accumulate tens of thousands of digital photographs over a lifetime. As a result, better systems for organizing and sorting digital images are needed to help a user keep track of and use these digital photographs.

Similar organizational problems may arise with the accumulation of other media files, such as emails or document files. Like digital photographs, a user can quickly accumulate vast amounts of these files and very often the user will not take the time to create unique file folders and place the files into the appropriate file folders. A user may intend to organize their files by returning to the files at a later time and renaming the files and/or placing the files in uniquely-named file folders; however, many users quickly fall behind using such an approach. These users may fall so behind that it is nearly impossible to sort back through all of the files.

With textual files the problem may not be as bad as with image files, since, with textual files, the user can often search through the stores of files using word searching software, where the software searches through the contents of each file to locate a particular word or phrase. However, with non-textual files, such as most image files, a user must actually view each of the thumbnails to have any indication of the content of the photograph. Organizing, sorting, and finding images is further hampered by the fact that most camera devices store each image using an indistinct file name, such as by storing consecutive images as consecutive numbers. What is needed is an easy way of annotating images and other files with information that will help identify and/or categorize the file. Preferably, a solution to the problem would allow for customized annotations that are personal to the user. It would also be preferable if the system allowed, if not forced, the user to annotate the files when the files are first created, viewed, opened, closed, or otherwise operated upon by the user.

Currently, a user may be able to use some electronic devices to annotate a photo in a post-processing stage. This annotation process, however, typically requires the user to go through at least several steps/menus in order to annotate the photo after it is taken. For example, a simple post-processing annotation may be where the user, after a photo is taken, (1) creates a sub folder, (2) modifies the folder's name to a unique/identifiable category name, and (3) stores the photo in this folder. This type of annotation procedure, however, has several disadvantages. First, folder navigation and file manipulation are time consuming tasks, particularly if attempted on a portable electronic device. Further, this method does not work well if a photo belongs in two or more categories. For example, suppose that a photo is of the user's family during their trip to New York City for Christmas in 2005. The user may desire to create three separate file folders entitled "family," "NYC trip," and "Christmas 2005" and place the photo in all three folders. Including the file in three different folders, however, would likely require the user to go through the folder-making process three times and require that three separate copies of the photo be made. As a result of all of the steps involved, a user will likely pick one folder to put the photo in, thus limiting the ability to quickly find particular photos of interest at a later time. Such a solution also limits the amount of annotation information to what can be written in the folder and files names. Furthermore, since text input is a tedious task on most portable electronic devices, any solution where the user must constantly type new file names, folder names, or other annotation information for each photo would not be optimal.

Available software may also enable a user to add annotations on a personal computer ("PC") at a much later time; after transferring the photos from the portable electronic device to the PC. In this case, however, the user has to remember which annotation should be included with which photos. As described above, because users typically transfer a large number of images at a time (e.g. over 100 photos for a medium-sized memory card), adding annotations by this approach can be very tedious for the user. More often than not, the user will likely be overwhelmed by the task of annotating 100 photos and will end up doing a poor job of organizing and/or annotating the photos.

Furthermore, when annotating images with post-processing software, the annotation often must be external of the image file and is typically application dependent. Thus, when a user moves the image file the photo annotation will often be left behind or at least will be incompatible with the application to which the user provided the image file.

In sum, the above described solutions typically require the user to go through many steps in order to organize or annotate a file, thus limiting the usability of such solutions. Furthermore, inputting text into a portable electronic device is often tedious, and some devices such as digital media storage don't even have text input ability at all. As a result, users will not use such solutions frequently.

Accordingly, a device is needed that encourages a user to add annotation information to an image or file when the image is first created, previewed, received, or opened by a portable electronic device. It would be beneficial if other applications could also utilize the annotation data included in or with a file. At the same time, the annotation process needs to be fast, easy, and require a minimum amount of steps and user inputs for the annotation process to be successfully utilized on a portable electronic device without frustrating or annoying the user. Along the same lines, the solution should be easy to operate with the limited number of keys or user input devices that are typically included on digital cameras, mobile phones, or other handheld electronic devices. Ideally, with regard to the annotation of digital photographs, the task of annotating photos would become intuitively integrated with the photo capturing task.

BRIEF SUMMARY OF THE INVENTION

In light of the forgoing background, embodiments of the present invention provide a device, method, computer program product, and apparatus for allowing a user to more easily annotate data files and/or images received by or created by an electronic device or system.

For example, according to one embodiment of the invention, an electronic device is provided including a processor, and a user interface operatively coupled to the processor and configured to facilitate communication between the processor and a user of the electronic device. The electronic device further comprises a memory operatively coupled to the processor and configured to store at least one media file containing media data. The processor of the electronic device is configured to utilize the user interface to prompt the user to annotate the media data. In one embodiment, the processor is configured to prompt the user automatically after the electronic device performs a function related to the media data. In another embodiment, the user interface comprises a display and the processor is configured to use the display to prompt the user by presenting an annotation dialog displayed semi-transparently over a representation of the media data also displayed on the display.

In one embodiment, the processor is configured to utilize the user interface to automatically prompt the user to annotate the media data when the media data is first received by the electronic device, first created by the electronic device, or first displayed by the electronic device, or when the media file is first opened or first closed in the electronic device by the user.

In another embodiment, the electronic device comprises a camera, and the media data comprises image data received from the camera. The electronic device may be configured to allow the user to annotate the media data when the electronic device first presents a preview of the image data to the user. In one embodiment, the electronic device may be configured to allow the user to annotate the media data immediately after an image is taken using the camera. The electronic device may be further configured to store the media data in a memory, and to compress or store the media data in the memory while the electronic device prompts the user to annotate the media data or processes annotation information received from the user.

In one embodiment, the electronic device further comprises a communication interface configured to receive data from a source outside of the electronic device. The media data may comprise data received via the communication interface, and the processor may utilize the user interface to automatically prompt the user to annotate the media data after the data is received via the communication interface and is presented to the user via the user interface.

In one embodiment, the user interface includes a display device and a user input device. The processor is configured to prompt the user to annotate the media file by utilizing at least a portion of the display device to display an annotation dialog. The annotation dialog comprises a representation of at least one selectable annotation. The user input device is configured to allow the user to select at least one selectable annotation by selecting the representation of the selectable annotation. In one embodiment, the annotation dialog is displayed semi-transparently over a representation of the media file. At least one selectable annotation may include user-defined annotation information. Such customized information may be entered by the user using the electronic device. Alternatively, the user-defined annotation information includes information received from an external device.

In one embodiment, the user input device of the electronic device comprises a keypad including a plurality of keys that correspond to at least one selectable annotation. For example, the layout of the representations of selectable annotations on the display device may correspond to the layout of the keys on the keypad. In another embodiment, the representation of at least one selectable annotation comprises a graphical icon.

In one embodiment, the electronic device stores the media file in the memory, and is configured to compress and/or store the media file in the memory while prompting the user to annotate the media file and/or while processing the annotation information received from the user. The electronic device may be configured to store annotation data in the media file as embedded metadata or may be configured to use the annotation input to create at least one folder for storing the media file therein. The folder may have an identifier, and the folder identifier may be at least partially based on the annotation input. The electronic device may be configured to use the annotation input to store the media file into at least one folder.

The media file to be annotated may include image data, email data, text message data, voicemail message data, or a text-based document. The annotation data may include textual data, image data, or audio data. The user interface may comprise a microphone and voice recognition software so that annotation input can be entered by the user speaking into the microphone. The user interface may comprise a touch screen. The electronic device may be embodied in a handheld device, such as a mobile telephone or a digital camera.

Another embodiment of the present invention provides a method of annotating digital images after images are captured. The method includes the steps of: receiving a digital image; prompting a user to enter annotation input for the digital image; receiving annotation input from the user; and using the annotation input to annotate the digital image. The prompting step may include prompting the user automatically after or upon receiving a digital image. The providing step may further include automatically presenting the user with a list of selectable annotation inputs after the digital image is captured. The receiving step may include receiving annotation input in the form of a user selection of one selectable annotation, and, upon the receipt of the one selection, automatically annotating the digital image. The receiving step may include: receiving annotation input in the form of a user selection of at least one selectable annotation; and receiving a separate indication from the user that the selected annotation(s) should be used to annotate the digital image. The using step may include using the annotation input to store annotation information with a digital image file. The annotation information may be stored in the digital image file as embedded metadata or stored in a file separate from, but associated with, the digital image file. The using step might also include using the annotation input to store the digital image in at least one folder related to the annotation input.

Another embodiment of the present invention provides an apparatus comprising a processing element configured to: receive media data; store the media data in a memory portion of the apparatus; prompt a user to enter annotation input for the media data; receive annotation input from the user; and use the annotation input to annotate the digital image. In one embodiment, the processing element is configured to prompt the user to enter annotation input automatically after receiving the media data.

Another embodiment of the present invention provides a computer program product for facilitating the annotation of a digital image after the image is captured, the computer program product comprising at least one computer-readable storage medium having computer-readable program code portions stored therein, the computer-readable program code portions comprising: a first executable portion for receiving an indication of the capture of a digital image; a second executable portion for prompting a user to enter annotation input for the digital image, wherein the second executable prompts the user automatically after receiving the indication of the digital image capture; a third executable for receiving annotation input from the user; and a fourth executable for using the annotation input to annotate the digital image.

BRIEF DESCRIPTION OF THE SEVERAL VIEWS OF THE DRAWING(S)

Having thus described the invention in general terms, reference will now be made to the accompanying drawings, which are not necessarily drawn to scale, and wherein:

Figure 5:
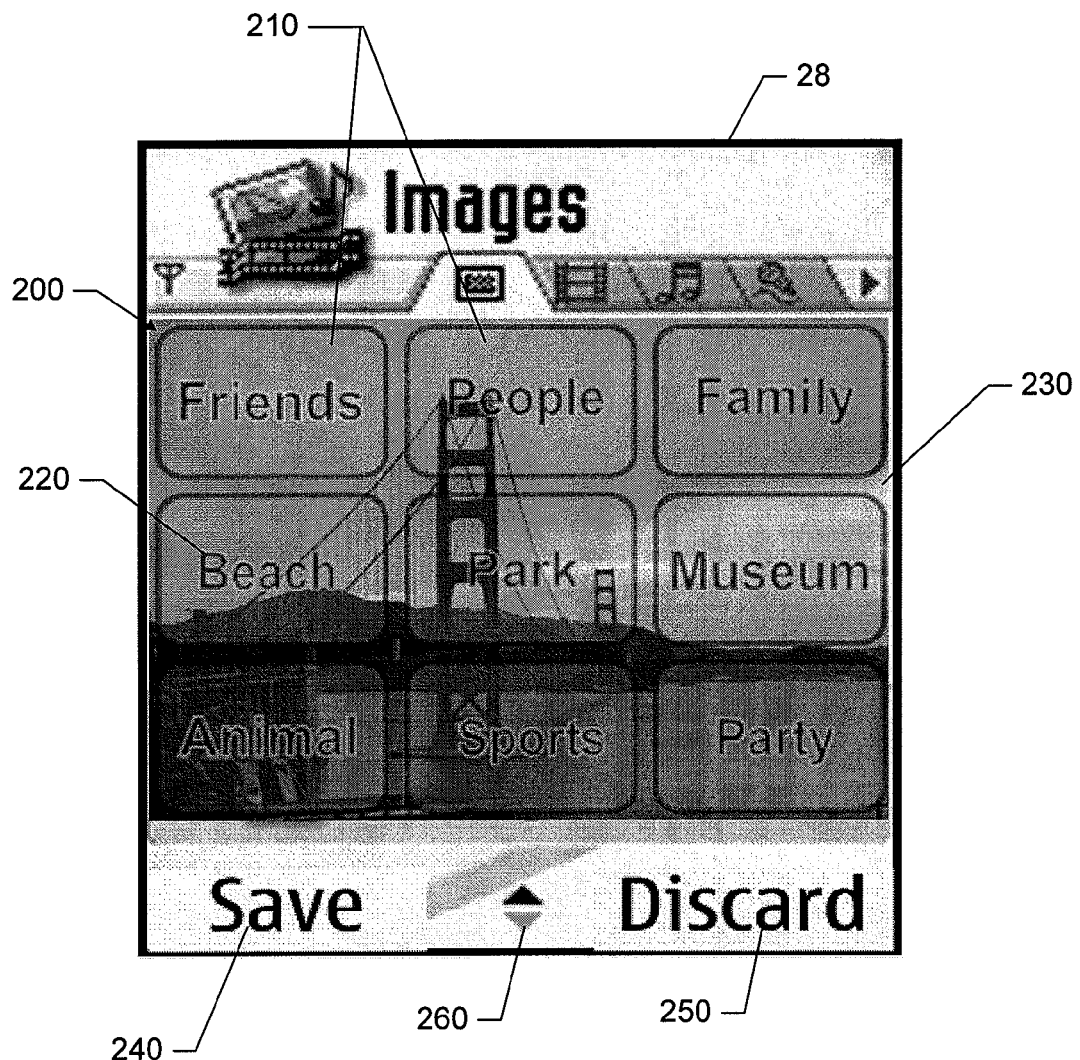
Figure 6:
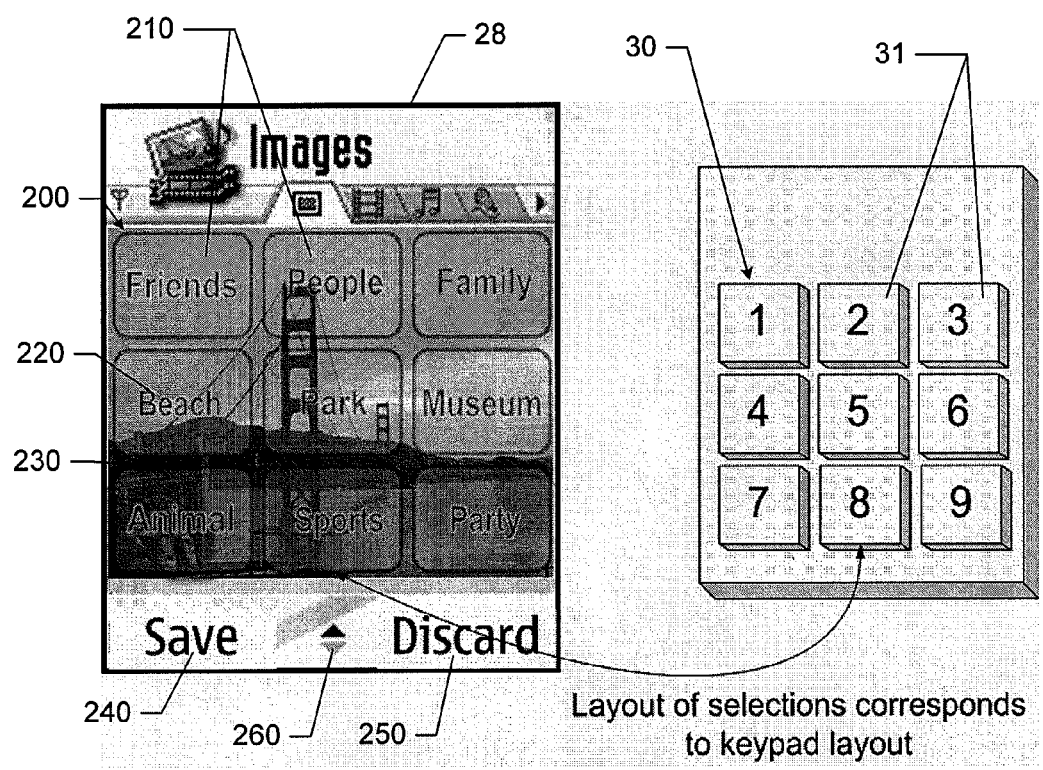

FIG. 5 is an illustration of an exemplary embodiment of the display view showing the annotation dialog semi-transparently overlaying a preview of a captured image; and FIG. 6 is an illustration of an exemplary embodiment of the display view and an exemplary keypad showing how the layout of the selectable annotations may correspond to the keypad layout according to an embodiment of the present invention.

DETAILED DESCRIPTION OF THE INVENTION

The present inventions now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements throughout.

Figure 1:
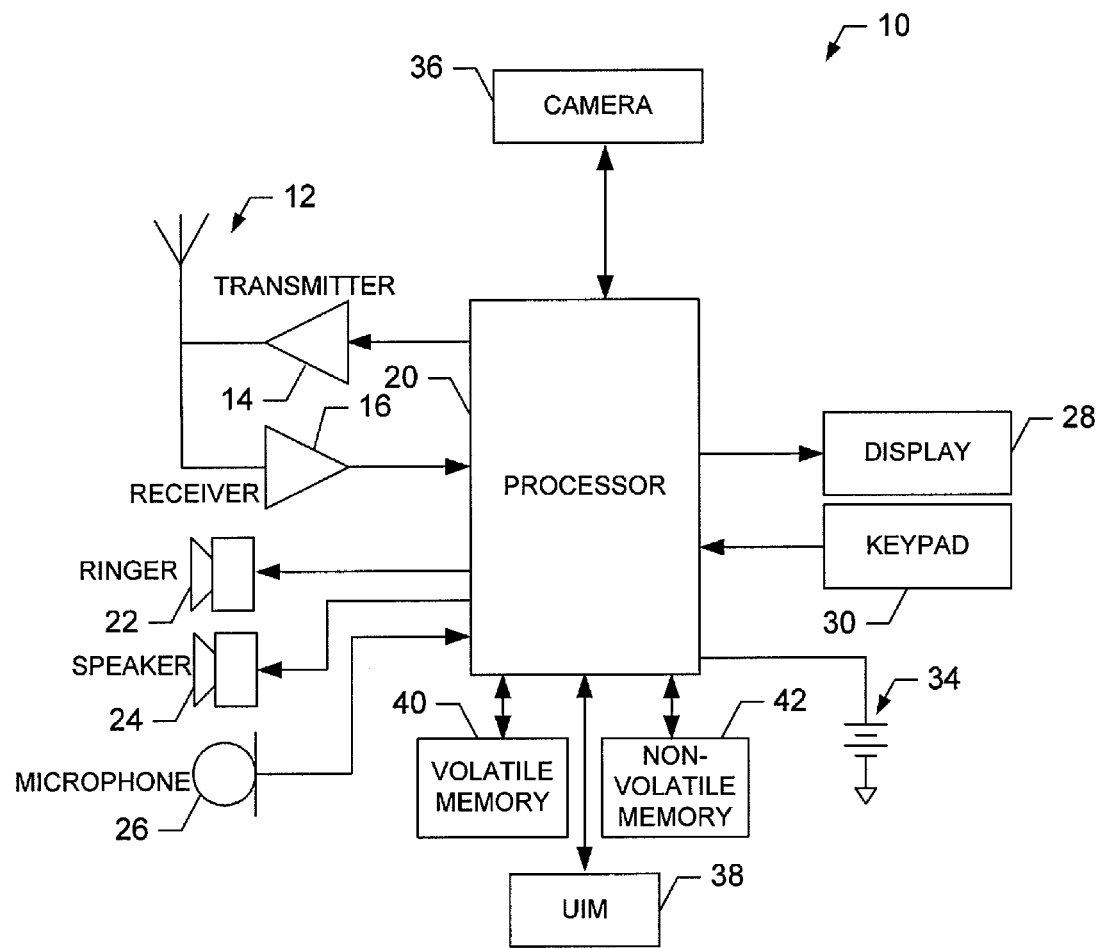
FIG. 1 is a schematic block diagram of a mobile terminal according to an exemplary embodiment of the present invention.

FIG. 1 illustrates a block diagram of an electronic device, and specifically a mobile terminal 10, that would benefit from one embodiment of the present invention. It should be understood, however, that a mobile telephone as illustrated and hereinafter described is merely illustrative of one type of electronic device that would benefit from embodiments of the present invention and, therefore, should not be taken to limit the scope of the present invention. While several embodiments of the mobile terminal 10 are illustrated and will be hereinafter described for purposes of example, other types of electronic devices, such as digital cameras, portable digital assistants (PDAs), pagers, mobile televisions, computers, laptop computers, and other types of systems that manipulate and/or store data files, can readily employ embodiments of the present invention. Such devices may or may not be mobile.

In addition, while several embodiments of the method of the present invention are described herein as being performed or used by a mobile terminal 10, the method may be employed by other than a mobile terminal. Moreover, the system and method of the present invention will be primarily described in conjunction with image capturing applications. It should be understood, however, that the system and method of the various embodiments can be utilized in conjunction with a variety of other applications, involving annotating and organizing image data or annotating and organizing other types of data or media files. For example, embodiments of the present invention may be useful for annotating email files, document files, audio files, and the like. As described earlier, embodiments of the invention may prove to be most useful for annotating image files since image files cannot be easily searched or sorted by the contents of the file; however, this does not mean to suggest that embodiments of the present invention cannot be used in many other applications.

The mobile terminal 10 includes a communication interface comprising an antenna 12 in operable communication with a transmitter 14 and a receiver 16. The mobile terminal 10 further includes a processor 20 or other processing element that provides signals to and receives signals from the transmitter 14 and receiver 16, respectively. The signals include signaling information in accordance with the air interface standard of the applicable cellular system, and also user speech and/or user generated data. In this regard, the mobile terminal 10 is capable of operating with one or more air interface standards, communication protocols, modulation types, and access types. By way of illustration, the mobile terminal 10 is capable of operating in accordance with any of a number of first, second and/or third-generation communication protocols or the like. For example, the mobile terminal 10 may be capable of operating in accordance with second-generation (2G) wireless communication protocols IS-136 (TDMA), GSM, and IS-95 (CDMA) or third-generation wireless communication protocol Wideband Code Division Multiple Access (WCDMA).

It is understood that the processor 20 includes circuitry required for implementing audio and logic functions of the mobile terminal 10. For example, the processor 20 may be comprised of a digital signal processor device, a microprocessor device, and various analog to digital converters, digital to analog converters, and other support circuits. Control and signal processing functions of the mobile terminal 10 are allocated between these devices according to their respective capabilities. The processor 20 thus may also include the functionality to convolutionally encode and interleave message and data prior to modulation and transmission. The processor 20 can additionally include an internal voice coder, and may include an internal data modem. Further, the processor 20 may include functionality to operate one or more software programs, which may be stored in memory. For example, the processor 20 may be capable of operating a connectivity program, such as a conventional Web browser. The connectivity program may then allow the mobile terminal 10 to transmit and receive Web content, such as location-based content, according to a Wireless Application Protocol (WAP), for example.

The mobile terminal 10 also comprises a user interface including an output device such as a conventional earphone or speaker 24, a ringer 22, a microphone 26, a display 28, and a user input interface, all of which are coupled to the processor 20. The user input interface, which allows the mobile terminal 10 to receive data, may include any of a number of devices allowing the mobile terminal 10 to receive data, such as a keypad 30, a touch display (not shown) or other input device. In embodiments including the keypad 30, the keypad 30 may include the conventional numeric (0-9) and related keys (#, *), and other keys used for operating the mobile terminal 10. Alternatively, the keypad 30 may include a conventional QWERTY keypad. The mobile terminal 10 further includes a battery 34, such as a vibrating battery pack, for powering various circuits that are required to operate the mobile terminal 10, as well as optionally providing mechanical vibration as a detectable output.

In an exemplary embodiment, the mobile terminal 10 includes a camera 36 in communication with the processor 20. The camera 36 may be any means for capturing an image for storage, display or transmission. For example, the camera 36 may include a digital camera capable of forming a digital image file from a captured image. As such, the camera 36 includes all hardware, such as a lens or other optical device, and software necessary for creating a digital image file from a captured image. Alternatively, the camera 36 may include only the hardware needed to view an image, while a memory device of the mobile terminal 10 stores instructions for execution by the processor 20 in the form of software necessary to create a digital image file from a captured image. In an exemplary embodiment, the camera 36 may further include a processing element such as a co-processor which assists the processor 20 in processing image data and an encoder and/or decoder for compressing and/or decompressing image data. The encoder and/or decoder may encode and/or decode according to a JPEG standard format.

The mobile terminal 10 may further include a user identity module (UIM) 38. The UIM 38 is typically a memory device having a processor built in. The UIM 38 may include, for example, a subscriber identity module (SIM), a universal integrated circuit card (UICC), a universal subscriber identity module (USIM), a removable user identity module (R-UIM), etc. The UIM 38 typically stores information elements related to a mobile subscriber. In addition to the UIM 38, the mobile terminal 10 may be equipped with memory. For example, the mobile terminal 10 may include volatile memory 40, such as volatile Random Access Memory (RAM) including a cache area for the temporary storage of data. The mobile terminal 10 may also include other non-volatile memory 42, which can be embedded and/or may be removable. The non-volatile memory 42 can additionally or alternatively comprise an EEPROM, flash memory or the like, such as that available from the SanDisk Corporation of Sunnyvale, Calif., or Lexar Media Inc. of Fremont, Calif. The memories can store any of a number of pieces of information, and data, used by the mobile terminal 10 to implement the functions of the mobile terminal 10. For example, the memories can include an identifier, such as an international mobile equipment identification (IMEI) code, capable of uniquely identifying the mobile terminal 10.

Figure 2:
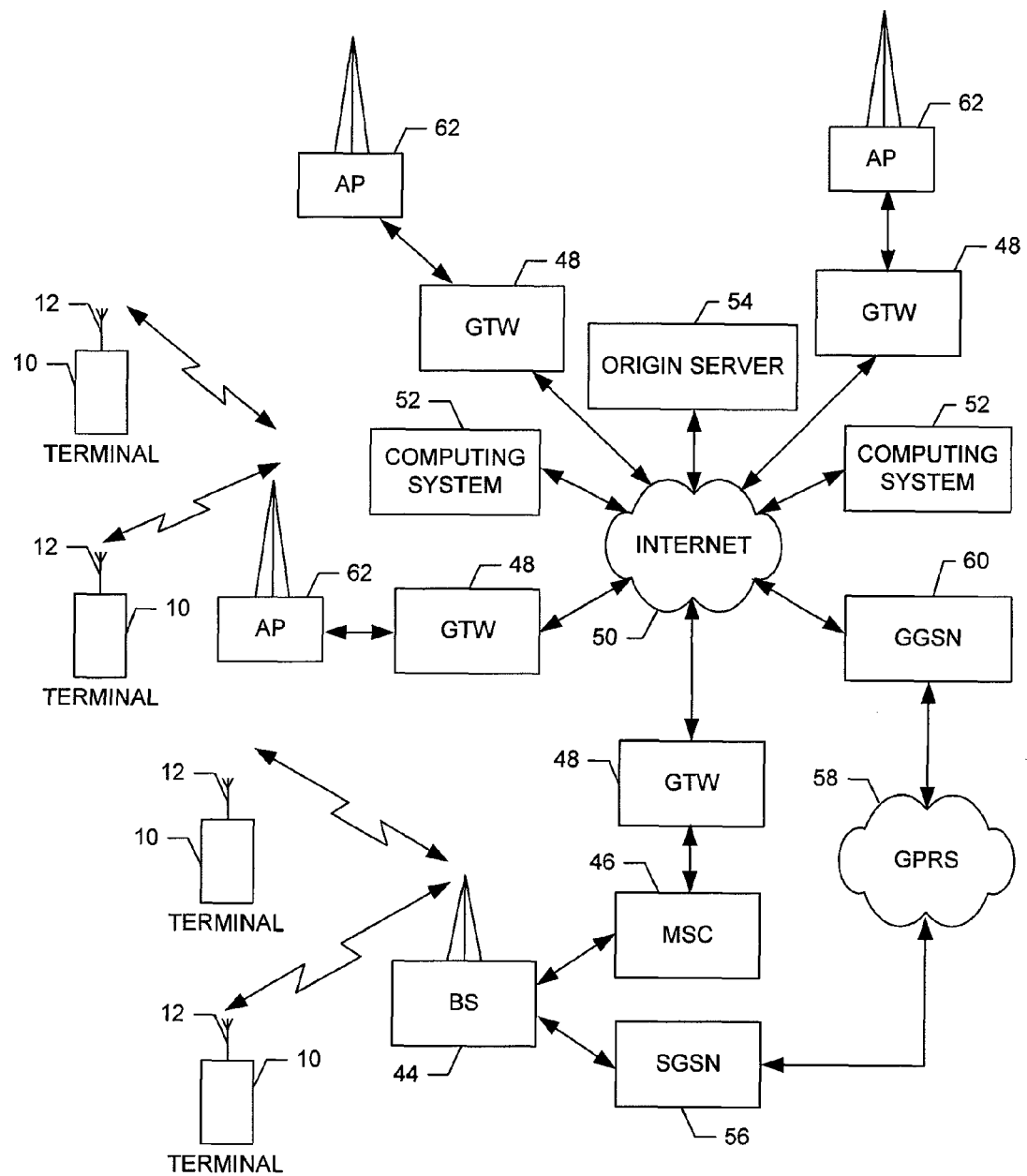
FIG. 2 is a schematic block diagram of a wireless communications system according to an exemplary embodiment of the present invention.

Referring now to FIG. 2, an illustration of one type of system that would benefit from the present invention is provided. The system includes a plurality of network devices. As shown, one or more mobile terminals 10 may each include an antenna 12 for transmitting signals to and for receiving signals from a base site or base station (BS) 44. The base station 44 may be a part of one or more cellular or mobile networks each of which includes elements required to operate the network, such as a mobile switching center (MSC) 46. As well known to those skilled in the art, the mobile network may also be referred to as a Base Station/MSC/Interworking function (BMI). In operation, the MSC 46 is capable of routing calls to and from the mobile terminal 10 when the mobile terminal 10 is making and receiving calls. The MSC 46 can also provide a connection to landline trunks when the mobile terminal 10 is involved in a call. In addition, the MSC 46 can be capable of controlling the forwarding of messages to and from the mobile terminal 10, and can also control the forwarding of messages for the mobile terminal 10 to and from a messaging center. It should be noted that although the MSC 46 is shown in the system of FIG. 2, the MSC 46 is merely an exemplary network device and embodiments of the present invention are not limited to use in a network employing an MSC.

The MSC 46 can be coupled to a data network, such as a local area network (LAN), a metropolitan area network (MAN), and/or a wide area network (WAN). The MSC 46 can be directly coupled to the data network. In one typical embodiment, however, the MSC 46 is coupled to a GTW 48, and the GTW 48 is coupled to a WAN, such as the Internet 50. In turn, devices such as processing elements (e.g., personal computers, server computers or the like) can be coupled to the mobile terminal 10 via the Internet 50. For example, as explained below, the processing elements can include one or more processing elements associated with a computing system 52 (two shown in FIG. 2), origin server 54 (one shown in FIG. 2) or the like, as described below.

The BS 44 can also be coupled to a signaling GPRS (General Packet Radio Service) support node (SGSN) 56. As known to those skilled in the art, the SGSN 56 is typically capable of performing functions similar to the MSC 46 for packet switched services. The SGSN 56, like the MSC 46, can be coupled to a data network, such as the Internet 50. The SGSN 56 can be directly coupled to the data network. In a more typical embodiment, however, the SGSN 56 is coupled to a packet-switched core network, such as a GPRS core network 58. The packet-switched core network is then coupled to another GTW 48, such as a GTW GPRS support node (GGSN) 60, and the GGSN 60 is coupled to the Internet 50. In addition to the GGSN 60, the packet-switched core network can also be coupled to a GTW 48. Also, the GGSN 60 can be coupled to a messaging center. In this regard, the GGSN 60 and the SGSN 56, like the MSC 46, may be capable of controlling the forwarding of messages, such as MMS messages. The GGSN 60 and SGSN 56 may also be capable of controlling the forwarding of messages for the mobile terminal 10 to and from the messaging center.

In addition, by coupling the SGSN 56 to the GPRS core network 58 and the GGSN 60, devices such as a computing system 52 and/or origin server 54 may be coupled to the mobile terminal 10 via the Internet 50, SGSN 56 and GGSN 60. In this regard, devices such as the computing system 52 and/or origin server 54 may communicate with the mobile terminal 10 across the SGSN 56, GPRS core network 58 and the GGSN 60. By directly or indirectly connecting mobile terminals 10 and the other devices (e.g., computing system 52, origin server 54, etc.) to the Internet 50, the mobile terminals 10 may communicate with the other devices and with one another, such as according to the Hypertext Transfer Protocol (HTTP), to thereby carry out various functions of the mobile terminals 10.

Although not every element of every possible mobile network is shown and described herein, it should be appreciated that the mobile terminal 10 may be coupled to one or more of any of a number of different networks through the BS 44. In this regard, the network(s) can be capable of supporting communication in accordance with any one or more of a number of first-generation (1G), second-generation (2G), 2.5G, third-generation (3G) and/or future mobile communication protocols or the like. For example, one or more of the network(s)

can be capable of supporting communication in accordance with 2G wireless communication protocols IS-136 (TDMA), GSM, and IS-95 (CDMA). Also, for example, one or more of the network(s) can be capable of supporting communication in accordance with 2.5G wireless communication protocols GPRS, Enhanced Data GSM Environment (EDGE), or the like. Further, for example, one or more of the network(s) can be capable of supporting communication in accordance with 3G wireless communication protocols such as Universal Mobile Telephone System (UMTS) network employing Wideband Code Division Multiple Access (WCDMA) radio access technology. Some narrow-band AMPS (NAMPS), as well as TACS, network(s) may also benefit from embodiments of the present invention, as should dual or higher mode mobile stations (e.g., digital/analog or TDMA/CDMA/analog phones).

The mobile terminal 10 can further be coupled to one or more wireless access points (APs) 62. The APs 62 may comprise access points configured to communicate with the mobile terminal 10 in accordance with techniques such as, for example, radio frequency (RF), Bluetooth (BT), infrared (IrDA) or any of a number of different wireless networking techniques, including wireless LAN (WLAN) techniques such as IEEE 802.11 (e.g., 802.11a, 802.11b, 802.11g, 802.11n, etc.), WiMAX techniques such as IEEE 802.16, and/or ultra wideband (UWB) techniques such as IEEE 802.15 or the like. The APs 62 may be coupled to the Internet 50. Like with the MSC 46, the APs 62 can be directly coupled to the Internet 50. In one embodiment, however, the APs 62 are indirectly coupled to the Internet 50 via a GTW 48. Furthermore, in one embodiment, the BS 44 may be considered as another AP 62. As will be appreciated, by directly or indirectly connecting the mobile terminals 10 and the computing system 52, the origin server 54, and/or any of a number of other devices, to the Internet 50, the mobile terminals 10 can communicate with one another, the computing system, etc., to thereby carry out various functions of the mobile terminals 10, such as to transmit data, content or the like to, and/or receive content, data or the like from, the computing system 52. As used herein, the terms "data," "content," "information" and similar terms may be used interchangeably to refer to data capable of being transmitted, received and/or stored in accordance with embodiments of the present invention. Thus, use of any such terms should not be taken to limit the spirit and scope of the present invention.

Although not shown in FIG. 2, in addition to or in lieu of coupling the mobile terminal 10 to computing systems 52 across the Internet 50, the mobile terminal 10 and computing system 52 may be coupled to one another and communicate in accordance with, for example, RF, BT, IrDA or any of a number of different wireline or wireless communication techniques, including LAN, WLAN, WiMAX and/or UWB techniques. One or more of the computing systems 52 can additionally, or alternatively, include a removable memory capable of storing content, which can thereafter be transferred to the mobile terminal 10. Further, the mobile terminal 10 can be coupled to one or more electronic devices, such as printers, digital projectors and/or other multimedia capturing, producing and/or storing devices (e.g., other terminals). Like with the computing systems 52, the mobile terminal 10 may be configured to communicate with the portable electronic devices in accordance with techniques such as, for example, RF, BT, IrDA or any of a number of different wireline or wireless communication techniques, including USB, LAN, WLAN, WiMAX and/or UWB techniques.

An exemplary embodiment of the invention will now be described with reference to the mobile terminal and network of FIGS. 1 and 2. As described above, embodiments of the present invention are not limited to mobile terminals and can be used with any number of electronic devices or systems without departing from the spirit and scope of the present invention.

Figure 3:
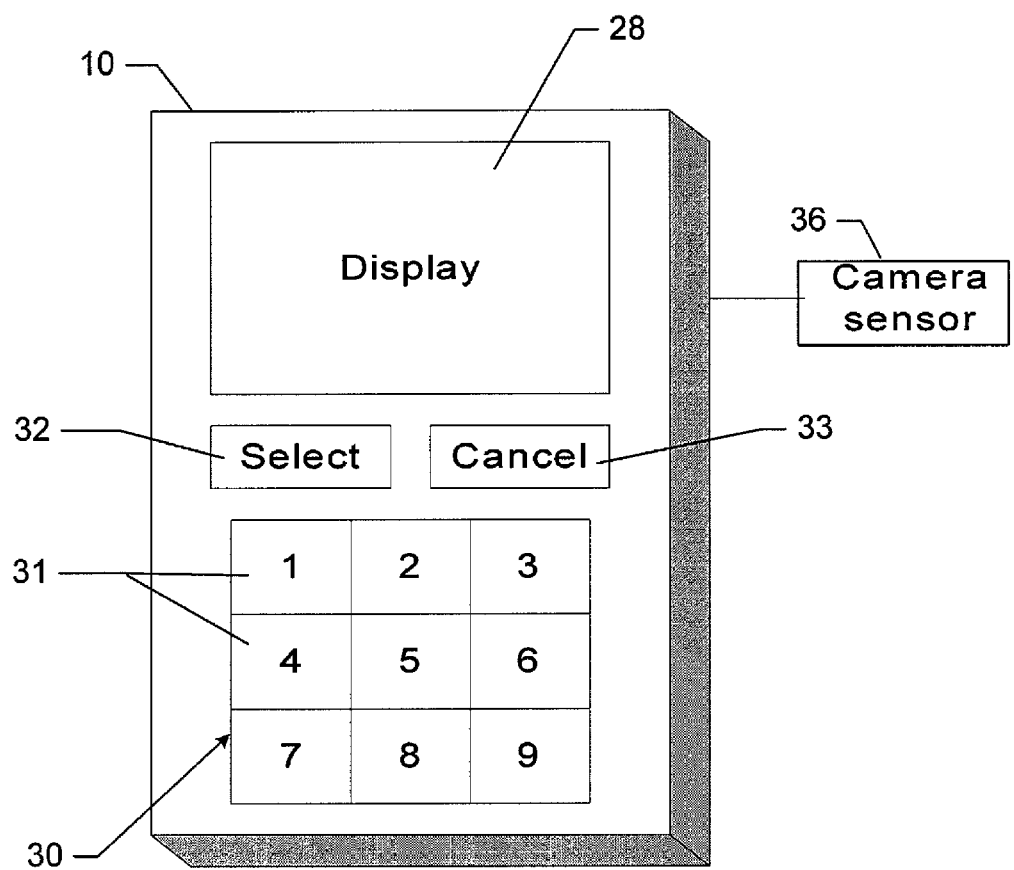
FIG. 3 is an illustration of an exemplary mobile terminal that may benefit from one embodiment of the present invention.

FIG. 3 illustrates a simplified mobile terminal 10 that would benefit from embodiments of the present invention. Although the mobile terminal 10 depicted by FIG. 3 is shown only to have select functionality, the mobile terminal of FIG. 3 is merely illustrative of one type of electronic device that may benefit from embodiments of the present invention and should not be taken to limit the scope of the present invention. While several embodiments of the mobile terminal 10 are illustrated and will be hereinafter described for purposes of example, other types of portable electronic devices, such as mobile telephones, digital cameras, video cameras, portable digital assistants (PDAs), pagers, mobile televisions, laptop computers, and other types portable electronic devices, can readily employ embodiments of the present invention. Furthermore, devices that are not portable may also readily employ embodiments of the present invention.

In addition, while several embodiments of the method of the present invention are performed or used by a mobile terminal 10, the method may be employed by other than the mobile terminal 10. It should be understood, that the system and method of embodiments of the present invention can be utilized in conjunction with a variety of applications.

In the embodiment depicted by FIG. 3, the mobile terminal 10 includes a display 28, a user input interface 30-33, and a camera 36. Naturally, if the mobile terminal 10 was, for example, a mobile telephone, the mobile terminal would include other systems and functionality common to mobile telephones. Such systems may include a speaker system, a microphone system, an antenna system, other user input/output systems, etc. The mobile terminal further comprises a processor (as shown in FIG. 1), which may be located within the housing of the mobile terminal. The processor is operatively coupled to the display 28, the user input interface, and the camera 36. It is understood that the processor includes required circuitry for implementing the logic functions of the mobile terminal 10 as described above in connection with FIG. 1. Further, the processor may include functionality to operate one or more software programs, which may be stored in a memory (not shown) that may also be located within the housing of the mobile terminal 10 or is otherwise accessible by the processor.

In an exemplary embodiment, the display 28 includes a liquid crystal display (LCD) for displaying information to a user of the mobile terminal 10. Although the display is described herein generally as a liquid crystal display, other types of displays can be used. For example, embodiments of the present invention may comprise light-emitting diode (LED) displays, organic LED (OLED) displays, plasma-based displays, etc.

In the depicted embodiment, the mobile terminal 10 includes a camera 36 for capturing digital images. The camera 36 may be any means for capturing an image for storage, display, or transmission. For example, the camera 36 may include a digital camera sensor capable of forming digital image data from a captured image. As such, the camera 36 may include all hardware, such as a lens, image sensor, and/or other optical sensing device for capturing an image and creating a digital image file from a captured image. The camera 36 may also include software, a processor, and a memory necessary for capturing, processing, and storing image data, or alternatively, the processing system of the mobile terminal 10 may include such software and hardware. In another exemplary embodiment, the camera 36 may include a co-processor that assists the mobile terminal's processing system in processing image data. The camera 36 or the mobile terminal's processing system may also include an encoder and/or decoder for compressing and/or decompressing image data. For example, the encoder and/or decoder may encode and/or decode according to a JPEG standard format.

The camera 36 can be located internal to the mobile terminal 10. In one embodiment, the camera could alternatively be located externally from the mobile terminal 10 and configured to transmit image data to the electronic device via wired or wireless means.

The mobile terminal 10 further comprises a user input interface. The mobile terminal of FIG. 3 includes a user input interface comprised of a plurality of keys that the user can press to enter user input. For example, the embodiment of FIG. 3 shows a user input interface comprised of a numerical keypad 30 and two keys 32 and 33. The numerical keypad 30 includes nine individual keys 31 corresponding to numbers one through nine on the keypad. Such a keypad is similar to the type of keypad that one might find on any mobile telephone and that one would use to dial a number into the telephone. A more conventional numerical keypad that may be used with embodiments of the present invention might include a fourth row of three keys including the "*" key, the "0" key, and the "#" key commonly found on most telephones. The mobile terminal of FIG. 3 also includes two keys 28 and 29 that are marked "Select" and "Cancel," respectively. These keys could be dedicated keys that can be used if the user desires to select or cancel information displayed on the display 28. In one embodiment, these keys are "soft" keys that, depending on the mode of the mobile terminal or on how the key is operated, may be configured to perform the function indicated above the key on the display 28.

In other embodiments of the present invention, other user input devices or combinations of user input devices can be used. For example, typical input devices may include keys, buttons, joysticks, rocker keys, track balls, rollers, touch pads, etc. The user input interface may be coupled with the display 28 by using a touch screen. The user input interface may include a microphone coupled with a voice recognition system. In some embodiments, the user input interface may include an antenna for receiving radio frequency signals from an external user input interface. Such a wireless system may use radio frequency, infrared, Bluetooth®, or other wireless technology to communicate with the mobile terminal. Bluetooth® technology is remised on an open radio-frequency standard that enables cable-free voice and data communication between devices through short-range two-way radio (in the radio frequency range of 2.45 gigahertz). Many mobile electronic devices are already Bluetooth® enabled.

Figure 4:
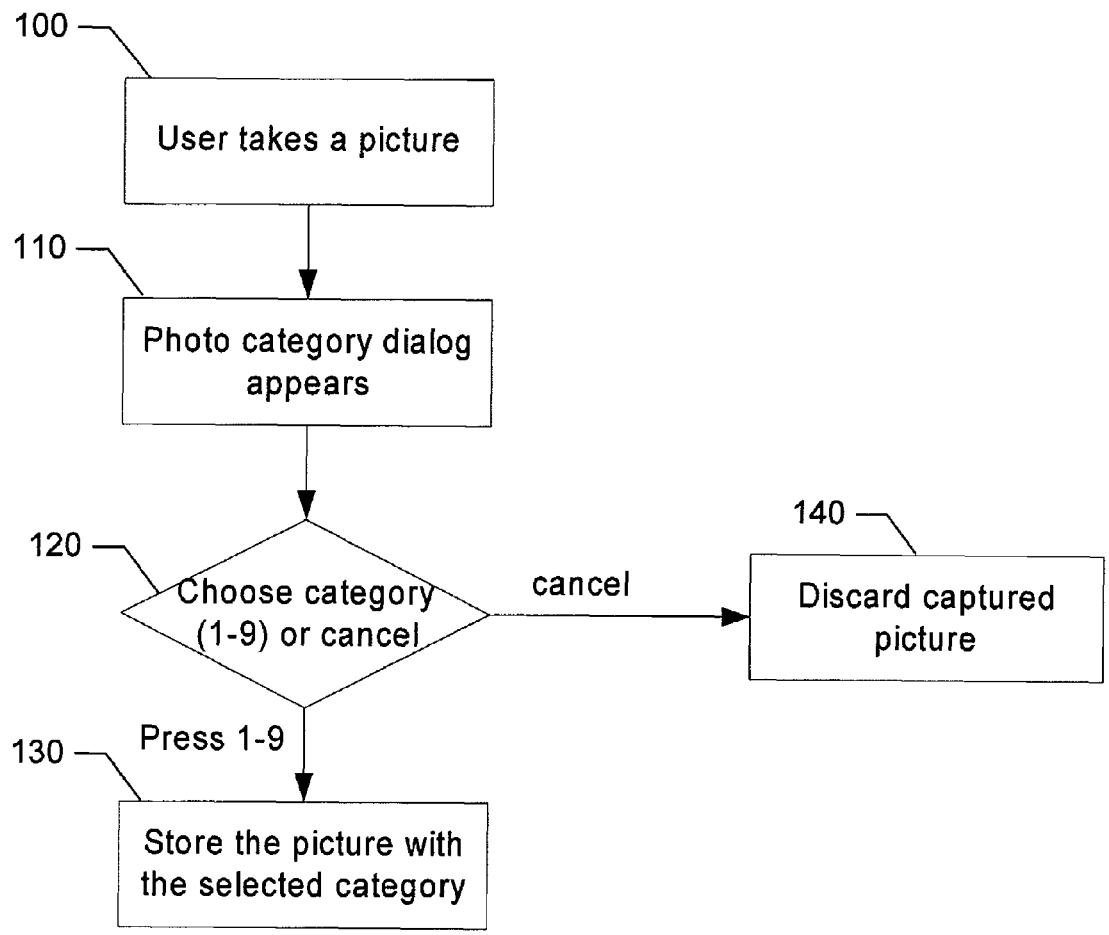
FIG. 4 is a flowchart of an exemplary method of annotating captured image data according to an exemplary embodiment of the present invention.

Referring now to the flowchart depicted in FIG. 4, an exemplary process is described wherein a user utilizes one embodiment of the present invention in conjunction with the exemplary mobile terminal 10 of FIG. 3. In operation 100, the user of the mobile terminal 10 operates the mobile terminal so that the camera 36 captures an image and converts the image to a digital format. In one embodiment, the display 28 may be used as an electronic viewfinder for displaying to the user an image of what would be captured by the camera sensor in the camera 36. In another embodiment, the electronic device includes a conventional viewfinder similar to that found on any conventional camera. In yet another embodiment, the electronic device comprises both types of viewfinders, thereby allowing the user to choose the preferred viewfinder. The user can use a dedicated key, a soft key, or some other user input device or system to instruct the electronic device to take the picture. Various picture taking means and processes can be used without departing from the present invention.

Once the mobile terminal 10 captures an image, the processor, typically operating under control of computer instructions, presents an annotation dialog on the display 28, as represented by operation 110. The processor uses the annotation dialog to prompt the user to enter annotation input for annotating the image that was just captured. In one embodiment, the processor uses an annotation dialog to present the user with at least one annotation, and preferably a list of annotations, that the user can select, using a user input device, to associate with the captured image data. As described in greater detail below, exemplary selectable annotations may relate to such things as the content of the image (e.g., who is in the image, where the image was taken, the date the image was taken, etc.), the photographer, the reason the image was taken, events surrounding when the image was taken, etc.

In an exemplary embodiment, the processor presents the annotation dialog to the user automatically and immediately after the camera captures the image. In this regard, for example, the processor automatically presents the user with the list of selectable annotations. In another embodiment, the processor presents the annotation dialog when the user presses a particular key shortly after an image is taken. The processor may save the captured image data to a file in a memory device prior to, concurrently with, or after the processor presents the annotation dialog to the user and the user actuates a user input device to select annotation data.

In one exemplary embodiment, the process of compressing and/or storing the image data is conducted by the processor in parallel with the annotation process. Such an embodiment may increase the speed of the overall process and may even be useful to distract the user while the processor compresses and/or stores the image data, which may take several seconds depending on the systems involved. In other embodiments, the processor presents annotation dialog to the user at other times. For example, the processor may present the annotation dialog when an image file is first opened or first previewed by the user, which may or may not be immediately following the image capture. In one embodiment, the electronic device has different user-selectable modes that allow the user to select when the annotation dialog should be displayed, and whether the annotation dialog should be displayed at all. In another embodiment, the annotation dialog may be required to be presented and an annotation required to be entered. Such a mandatory annotation system may be desirable for some users to prevent the user from delaying the annotation of the files.

In one embodiment, the camera cannot take a second image until the first image has been annotated by the user. In another embodiment, if the camera takes a second image before the first image is annotated, then the processor stores the first image in the memory without annotations or with default annotations. In yet another embodiment, if the camera takes consecutive images without being annotated, the processor presents the annotation dialogs at a later time.

As will be described below, in an exemplary embodiment, the processor displays the annotation dialog semi-transparently over a preview of the image, which the processor also displays on the display. The image preview may be a preview that is displayed on the display 28 automatically after an image is captured.

Embodiments of the present invention are not limited to any particular number of annotations that can be displayed or presented to the user in the annotation dialog. In an exemplary embodiment, the processor presents an annotation dialog that displays nine selectable annotations on the display 28 at any one time, and these nine annotations are displayed in a list numbered "1" through "9". In the described embodiment, and as represented by operation 120 in FIG. 4, the user can select an annotation using the keys 1-9 of the numerical keypad 30. In the depicted embodiment, pressing one of the keys 1-9 will select the corresponding annotation and cause the processor to store the image in the memory with the selected annotation embedded in the image file. Alternatively, in the depicted embodiment, the user can press the cancel key 33 in which the captured image will be immediately discarded or at least the annotation dialog will be closed. In an exemplary embodiment, selecting an annotation or the cancel key automatically causes the processor to close the annotation dialog displayed on the display 28 and uses the selected annotation, if any, to annotate the image file, as represented by operation 130. Thus, in such an embodiment, only one annotation may be selected when the annotation dialog is presented. Such a single-click feature may be desirable so that the annotation procedure requires a minimum amount of steps by the user, thereby making the process quick and easy.

In another embodiment, in step 120 the user use a user input device to select and de-select annotations without the system proceeding to step 130 automatically upon the selection of one annotation. Once the user is satisfied with the selection(s) made, the user could then press the "select" key 32 or some other dedicated or soft key that then instructs the processor to proceed to step 130.

In another embodiment, the processor may suggest one or more annotations for the captured image. For example, the system may be configured to suggest the same annotation that the user chose most recently. In such an embodiment, the user may be able to simply press the "Select" key 32 to enter the suggested annotation. This embodiment of the present invention might work well where the user is taking multiple pictures of the same subject matter. For example, suppose the user is traveling to Finland and wants all pictures taken during the trip to say "Finland 2006." In such a situation, using this embodiment of the invention, the user could quickly add annotation data simply pressing the "Select" key after every photo taken on the trip.

In some embodiments, the annotation dialog may have options that allow the user to enter a new annotation to the list of selectable annotations, edit annotation information, or enter one-time annotation information to be used with the file. For example, in one embodiment, the user takes a picture using the camera and the processor presents the annotation dialog to the user. The user may then be able to press a key to indicate to the processor that the user desires to customize the annotation. The user may then use a user input device to customize the annotation by creating a new annotation or editing a selected annotation. Once the annotation is customized by the user, the user may then press the same or another key and return to the annotation dialog where the user can then select the customized annotation or additional annotations.

Referring again to FIG. 4, operation 130 represents the step where the system takes the annotation data that was selected or otherwise entered by the user and uses that data to annotate the digital image file. In one exemplary embodiment, the annotation data, or at least data based upon the annotation data, is stored in the image file as embedded metadata, and the image file is stored in the memory.

In another exemplary embodiment, the information based on the selected annotations is stored in the memory in a separate file associated with the image file. In other exemplary embodiments, the selected annotation(s) can be used to create a folder(s) or a subfolder(s) in the memory and/or place the image into a particular folder(s) or subfolder(s) in the memory. Where the system is configured to create a folder based on a selected annotation, the processor creates a folder name, or some other folder identifier, that relates to the selected annotation.

FIG. 5 shows an exemplary annotation dialog 200 as it is appears on the display 28 of mobile terminal 10, according to one embodiment of the invention. In the depicted embodiment, the processor displays a preview 230 of the image to be annotated on a portion of the display 28. The processor also displays the annotation dialog semi-transparently overlaying the image preview 230. The annotation dialog comprises selectable annotations 210. In this embodiment, the processor displays nine selectable annotations at a time on the display. As illustrated by FIG. 6, the annotation dialog 200 and the selectable annotations 210 are configured to at least somewhat resemble the configuration of the keys of the mobile terminal. In the depicted embodiment, the nine displayed annotations 210 correspond to the keys "1"-"9", respectively on the numerical keypad 30. For example, pressing key "1", located in the upper left-hand corner of the keypad 30, would select the annotation labeled "Friends" in the upper left-hand corner of the annotation dialog. As described above, any number of user input devices may be used to select the annotations represented in the annotation dialog. For example, the display 28 may be a touch screen, thereby making it possible for the user to select an annotation by simply touching the screen over the representation of the annotation.

The display and/or the annotation dialog may comprise representations of other selectable items. For example, the functions "Save" 240 and "Discard" 250 are displayed and may be selectable by moving a cursor over each and pressing a select key. In one embodiment, the functions 240 and 250 may be labels for soft keys 32 and 33, respectively, indicating to the user what function the two keys would perform if pressed at that time. Similarly, arrows 260 may be displayed to indicate that the user can use an input device to scroll/page up or down. In one exemplary embodiment, if there are more selectable annotations than can be displayed on the display 28 at one time, the user can scroll/page down to view additional annotations.

Annotations 210 are displayed on the display using labels 220 indicating what annotation information the selectable annotation represents. For example, FIG. 5 shows annotations 210 with labels 220 such as "Beach", "Friends", and "Family". Labels 210 may represent the actual annotation data that will be saved with the file. For example, in such an embodiment, selecting the annotation "Beach" stores the word "Beach" with the image file, or stores the image file into a folder entitled "Beach". In another embodiment, the labels 210 represent some other annotation data that will be used to annotate the image file. For example, selecting the annotation "Beach" may actually store some other pre-determined text with the file. Alternatively or in addition to text-based annotation information, the annotation information may include images, audio, or any other data. In one embodiment, selecting an annotation 210 displayed on the annotation dialog causes a new list of annotations to be displayed that are subcategories of the selected annotation. For example, selecting "Family" from the annotation dialog depicted in FIG. 5 may cause an annotation dialog to appear having selectable annotations 210 for each member of the user's family and/or permitting free-form annotations.

As illustrated by FIG. 5, the labels 220 can be text-based. In one alternative embodiment, the labels are graphical icons representing the annotation information that would be stored with the image file if the user selected that icon.

In one advantageous embodiment, the annotation dialog is customizable by the user of the mobile terminal 10. In this regard, the user may be able to select from a list of suggested annotations to determine which annotations are to be displayed in the annotation dialog. In one embodiment, the user can not only define what annotations are displayed in the annotation dialog, but can also define and/or create new annotations and annotation categories. Accordingly, the processor may present a combination of user-defined annotations and default or standard annotations in the annotation dialog. For example, the annotation dialog may present an annotation 210 that represents text that the user entered describing the event that the user is attending. The annotation dialog may also present an annotation that represents the current date. The event information is customized, while the date may be a standard annotation that comes to the user already defined in the mobile terminal or the software. The electronic device may also provide partially created annotations that the user can customize by editing or adding to the annotations. In another embodiment, the electronic device receives annotation information from an external device via a communication interface operatively coupled to the processor of the electronic device.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. An apparatus comprising:
    at least one processor;
    at least one memory including computer program code, the at least one memory and the computer program code configured to, with the at least one processor, cause the apparatus to perform at least the following:
    facilitate communications with a user interface of the apparatus;
    facilitate storage of at least one media file containing media data;
    facilitate usage of at least a portion of a display device of the user interface to display a representation of the media data;
    cause prompting of a user to annotate the media data by utilizing at least a portion of the display device to display an annotation dialog comprising a representation of at least one predefined selectable annotation;
    display the annotation dialog semi-transparently over the representation of the media data; and
    enable the user to select the at least one predefined selectable annotation by selecting, via the user interface, the representation of the at least one predefined selectable annotation.

2. The apparatus of claim 1, further comprising a camera, wherein the media data comprises image data captured by the camera, and wherein the at least one memory and the computer program code configured to, with the at least one processor, cause the apparatus to facilitate display of the annotation dialog semi-transparently over a representation of the image data.

3. The apparatus of claim 1, wherein the user interface comprises a touch screen.

4. A method comprising:
    facilitating communications with a user interface of an apparatus;
    facilitating storage of at least one media file containing media data;
    facilitating usage of at least a portion of a display device of the user interface to display a representation of the media data;
    causing prompting, via a processor, of a user to annotate the media data by utilizing at least a portion of the display device to display an annotation dialog comprising a representation of at least one predefined selectable annotation;
    displaying the annotation dialog semi-transparently over the representation of the media data; and
    enabling the user to select the at least one predefined selectable annotation by selecting, via the user interface, the representation of the at least one predefined selectable annotation.

5. The method of claim 4, further comprising:
    capturing the media data which comprises image data; and
    facilitating display of the annotation dialog semi-transparently over a representation of the image data.

6. The method of claim 4, wherein the user interface comprises a touch screen.

7. A computer program product comprising at least one non-transitory computer-readable storage medium having computer-readable program code portions stored therein, the computer-readable program code portions comprising:
    program code instructions configured to facilitate communications with a user interface of an apparatus;
    program code instructions configured to facilitate storage of at least one media file containing media data;
    program code instructions configured to facilitate usage of at least a portion of a display device of the user interface to display a representation of the media data;
    program code instructions configured to cause prompting of a user to annotate the media data by utilizing at least a portion of the display device to display an annotation dialog comprising a representation of at least one predefined selectable annotation; and
    program code instructions configured to display the annotation dialog semi-transparently over the representation of the media data; and
    program code instructions configured to enable the user to select the at least one predefined selectable annotation by selecting, via the user interface, the representation of the at least one predefined selectable annotation.

8. The computer program product of claim 7, further comprising:
    program code instructions configured to facilitate capture of the media data which comprises image data; and
    program code instructions configured to enable display of the annotation dialog semi-transparently over a representation of the image data.

9. The computer program product of claim 7, wherein the user interface comprises a touch screen.

* * * * *